US010485155B2

(12) United States Patent
Henry

(10) Patent No.: US 10,485,155 B2
(45) Date of Patent: Nov. 26, 2019

(54) TILLAGE IMPLEMENT WITH SECTIONAL DOWN FORCE CONTROL

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 311 days.

(21) Appl. No.: 15/400,669

(22) Filed: Jan. 6, 2017

(65) Prior Publication Data

US 2018/0192573 A1    Jul. 12, 2018

(51) Int. Cl.
| | | |
|---|---|---|
| *A01B 73/04* | (2006.01) | |
| *A01B 63/32* | (2006.01) | |
| *A01B 49/02* | (2006.01) | |
| *A01B 23/04* | (2006.01) | |

(52) U.S. Cl.
CPC ............ *A01B 63/32* (2013.01); *A01B 49/027* (2013.01); *A01B 73/044* (2013.01); *A01B 23/043* (2013.01); *A01B 73/048* (2013.01)

(58) Field of Classification Search
CPC ..... A01B 63/111; A01B 63/114; A01B 63/32; A01B 33/087; A01B 73/044; A01B 73/048; A01B 73/046
See application file for complete search history.

(56) References Cited

U.S. PATENT DOCUMENTS

| | | | | |
|---|---|---|---|---|
| 8,794,344 | B2 * | 8/2014 | Blunier | A01B 63/32 |
| | | | | 111/200 |
| 9,215,837 | B2 * | 12/2015 | Adams | A01C 7/203 |
| 9,549,496 | B2 * | 1/2017 | Sudbrink | A01B 73/065 |
| 9,554,497 | B2 * | 1/2017 | Sudbrink | A01B 73/065 |
| 9,554,498 | B2 * | 1/2017 | Sudbrink | A01B 73/065 |
| 9,648,798 | B2 * | 5/2017 | Sudbrink | A01B 63/14 |
| 9,723,776 | B2 * | 8/2017 | Sporrer | A01B 63/32 |
| 9,752,596 | B2 * | 9/2017 | Sauder | F15B 11/042 |
| 9,775,278 | B2 * | 10/2017 | Zemenchik | A01B 79/005 |
| 10,028,423 | B2 * | 7/2018 | Sudbrink | A01B 63/32 |
| 2011/0290515 | A1 * | 12/2011 | Yuen | A01B 73/048 |
| | | | | 172/459 |
| 2014/0034342 | A1 * | 2/2014 | Friggstad | A01B 73/067 |
| | | | | 172/663 |
| 2014/0060869 | A1 * | 3/2014 | Blunier | A01B 63/32 |
| | | | | 172/326 |
| 2014/0214284 | A1 * | 7/2014 | Sauder | A01C 7/205 |
| | | | | 701/50 |
| 2016/0169253 | A1 * | 6/2016 | Sauder | F15B 11/042 |
| | | | | 91/166 |
| 2016/0212927 | A1 * | 7/2016 | Sudbrink | A01B 63/32 |

* cited by examiner

*Primary Examiner* — Matthew Troutman
(74) *Attorney, Agent, or Firm* — Rebecca L. Henkel; Rickard K. DeMille

(57) ABSTRACT

An agricultural tillage implement including a main frame section having a pull hitch tube extending in a travel direction and a plurality of pivotally coupled wing sections coupled with the main frame section. Each of the plurality of wing sections has at least one pivotal sub-frame. A hydraulic actuator is connected between the wing frame and the sub-frame to urge the sub-frame between an operating position and an elevated transport position. An actuator controller is configured to apply a predetermined force of the sub-frame towards the ground independently of other sub-frames so as to provide a more uniform tillage of the ground.

10 Claims, 5 Drawing Sheets

TILLAGE IMPLEMENT WITH SECTIONAL DOWN FORCE CONTROL

BACKGROUND OF THE INVENTION

1. Field of the Invention

The present invention relates to agricultural tillage implements, and, more particularly, to agricultural field cultivators.

2. Description of the Related Art

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

The various ground engaging components of the tillage implement are pivoted to an elevated transport position between fields so as to minimize the overall configuration of the implement for transport purposes. When in a field the ground engaging components are placed in contact with actuators displacing the support for the components from the transport to a lower, operational position. Heretofore, the weight of the ground engaging component and associated sub-frame was the only force urging the ground engaging components toward and/or into the ground. Depending up on the terrain and the speed of progress through the field, the ground engaging components may bounce and not maintain consistent and uniform contact.

Accordingly, it is an object of the present disclosure to provide a tillage implement with ground engaging components consistently contacting the ground.

SUMMARY OF THE INVENTION

The present disclosure provides a tillage implement with ground engaging components having a consistent uniform pressure towards the ground.

In one form, the disclosure is directed to a tillage implement having a main frame section including a pull hitch extending in a travel direction. At least one wing section is pivotally coupled to the main frame section to pivot outward to a laterally extending operating position. At least one sub-frame is pivotally connected to the said at least one wing section about a generally horizontal axis. A gauge wheel assembly is connected to the at least one sub-frame for establishing the elevation of the at least one sub-frame relative to the ground. An actuator is connected between the at least one wing section and the at least one sub-frame to pivot the sub-frame between an operating position where the gauge wheel contacts the ground and an elevated transport position. A controller is connected to and energizes the actuator to displace the sub-frame between the operating and transport positions and the controller is configured to urge the actuator to pivot the sub-frame towards the ground in the operating position.

In another form, the disclosure is directed to a method for operating a tillage implement having a mainframe and at least one wing section pivotally coupled with the main frame to pivot outward to a laterally extending operating position, at least one sub-frame pivotally connected to the wing section about a generally horizontal axis and an actuator urging the sub-frame between an elevated transport position and a lower operating position. The method includes the steps of pivoting the sub-frame to the operating position and urging the sub-frame towards the ground with a predetermined force.

One advantage of the present disclosure is a more uniform treatment and conditioning of the soil being tilled.

Another advantage is the ability to independently control the force with which ground engaging components engage the soil.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplification is not to be construed as limiting the scope of the invention in any manner.

DETAILED DESCRIPTION OF THE INVENTION

Figure 1:
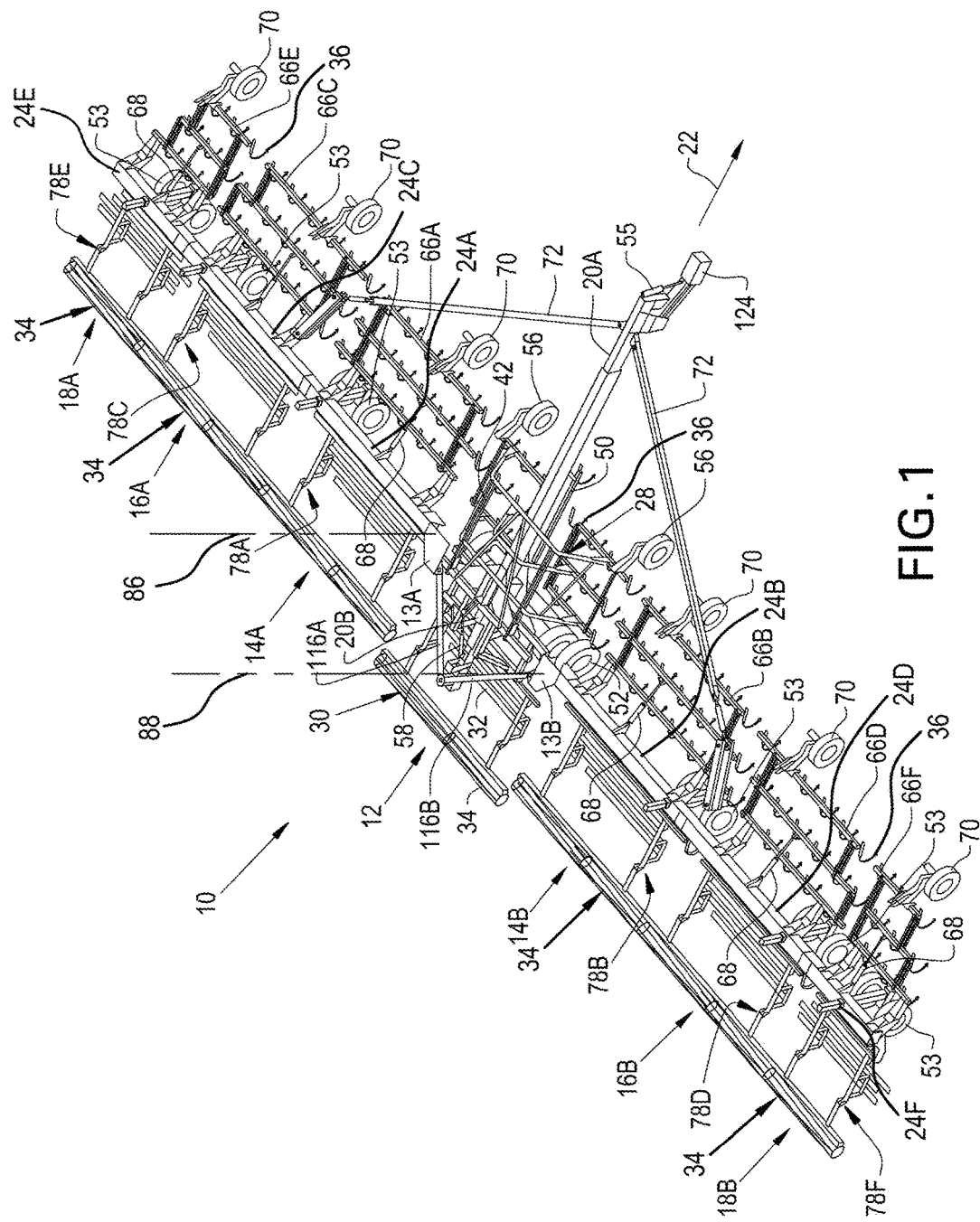
FIG. 1 is a top perspective view of an embodiment of an agricultural tillage implement of the present invention, in the form of a field cultivator.

Referring now to the drawings, and more particularly to FIGS. 1 through 4, there is shown an embodiment of an agricultural tillage implement of the present invention. In the illustrated embodiment, the agricultural tillage implement is in the form of a field cultivator 10 for tilling and finishing soil prior to seeding.

Agricultural tillage implement 10 is configured as a multi-section field cultivator, and includes a main frame section 12 and a plurality of segmented wing sections 14A, 14B, 16A, 16B, 18A, and 18B. The left segmented wing sections are designated 14A, 16A and 18A, and the right segmented wing sections are designated 14B, 16B and 18B. Segmented wing sections 14A and 14B are each inner wing sections, segmented wing sections 16A and 16B are each middle wing sections, and segmented wing sections 18A and 18B are each outer wing sections. Each segmented wing section 14A, 14B, 16A, 16B, 18A, and 18B may be provided with a tool bar segment, so that left inner wing section segment 14A is provided with left inner tool bar segment 24A, right inner wing section segment 14B is provided with right inner tool bar segment 24B, left middle wing section segment 16A is provided with left middle tool bar segment 24C, right middle wing section segment 16B is provided with right middle tool bar segment 24D, left outer wing section segment 18A is provided with left outer tool bar segment 24E, and right outer wing section segment 18B is provided with right outer tool bar segment 24F. Intermediate wings 13A and 13B may be attached to main frame section 12, and may provide generally vertical axes 86 and 88 about which the plurality of segmented wing sections 14A, 14B, 16A, 16B, 18A, and 18B pivot.

Wing front shank sub-frames 66A, 66B, 66C, 66D, 66E, and 66F are pivotally mounted to the wing sections 14A, 14B, 16A, 16B, 18A, and 18B, respectively. Gauge wheel assemblies 70 at the front of sub-frames 66A, 66B, 66C, 66D, 66E, and 66F are all configured as caster wheels and are not in contact with the ground when field cultivator 10 is in the folded or transport configuration. Gauge wheel assemblies 70 are adjustable to set the height of sub-frames 66A, 66B, 66C, 66D, 66E, and 66F relative to the ground. Sub-frames 66A, 66B, 66C, 66D, 66E, and 66F generally function to carry cultivator shanks 36 with shovels at their lower ends for tilling the soil. Hydraulic actuators 68 are connected between the wing sections 14A, 14B, 16A, 16B, 18A, and 18B and the sub-frames 66A, 66B, 66C, 66D, 66E, and 66F. Hydraulic actuators 68 pivot the wing sections 14A, 14B, 16A, 16B, 18A, and 18B between the operational position shown in FIG. 1 and a generally vertical position for transport.

The tool bar segments 24 pivotally mount left inner wing section rear auxiliary implement 78A, right inner wing section rear auxiliary implement 78B, left middle wing section rear auxiliary implement 78C, right middle wing section rear auxiliary implement 78D, left outer wing section rear auxiliary implement 78E, and right outer wing section rear auxiliary implement 78F. Each of the auxiliary implements may include spring tooth drags 32, crumbler baskets 34, spike tooth drags, cultivator shanks, or any combination thereof. Auxiliary implements 78A, 78B, 78C, 78D, 78E, and 78F may be folded upwards to a generally vertical transport position by actuators 80 pivotally connected between tool bar segments 24 and auxiliary implements 78A, 78B, 78C, 78D, 78E, and 78F (see FIG. 4).

Main frame section 12 is the center section that is directly towed by a traction unit, such as an agricultural tractor (not shown). Main frame section 12 includes a pull hitch tube 20, which may be a telescoping pull hitch tube 20, including a forward end 20A and a rearward end 20B, extending in a travel direction 22, and a tool bar 24 which is coupled with and extends transverse to pull hitch tube 20. Reinforcing gusset plates 26 may be used to strengthen the connection between pull hitch tube 20 and tool bar 24. Diagonally angled draft tubes 72 extend between a forward end 20A of pull hitch tube 20 and the wing sections 16A and 16B.

Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as spring tooth drags, crumbler baskets, spike tooth drags, cultivator shanks, etc.

Main shank frame 28 generally functions to carry cultivator shanks 36 with shovels at their lower ends for tilling the soil. Main shank frame 28 is pivotally coupled with tool bar 24, preferably at the top of tool bar 24. Main shank frame 28 is positioned in front of the tool bar 24 when in an operating configuration (FIG. 1), and is foldable up and over the tool bar 24 to a position rearward of tool bar 24 when in a transport configuration.

Main shank frame 28 also includes one or more gauge wheel assemblies 56 which function to set its elevation relative to the ground. A hydraulic cylinder 58 is used to fold main shank frame 28 from the operating configuration to the transport configuration, and vice versa.

Figure 5:
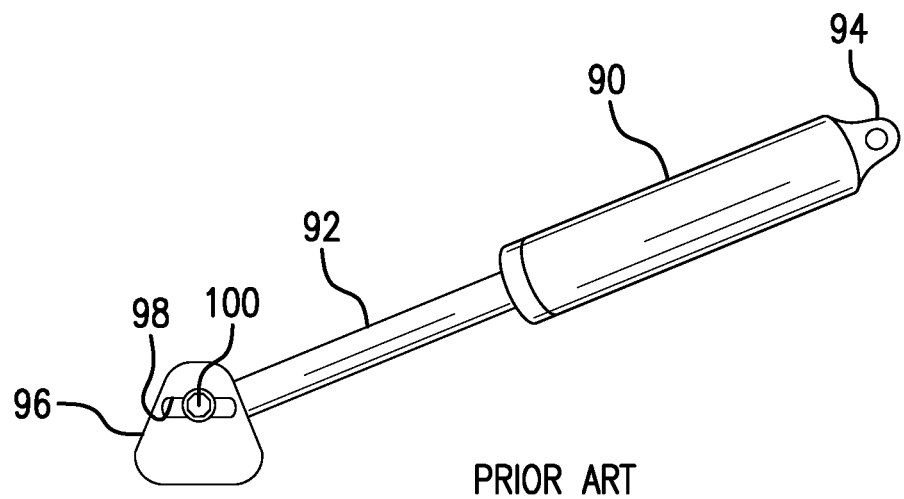
FIG. 5 shows a prior art interconnection of a lift actuator for a tillage implement; and, FIG. 6 shows an interconnection of a lift actuator for the tillage implement shown in FIG. 1.
Figure 6:
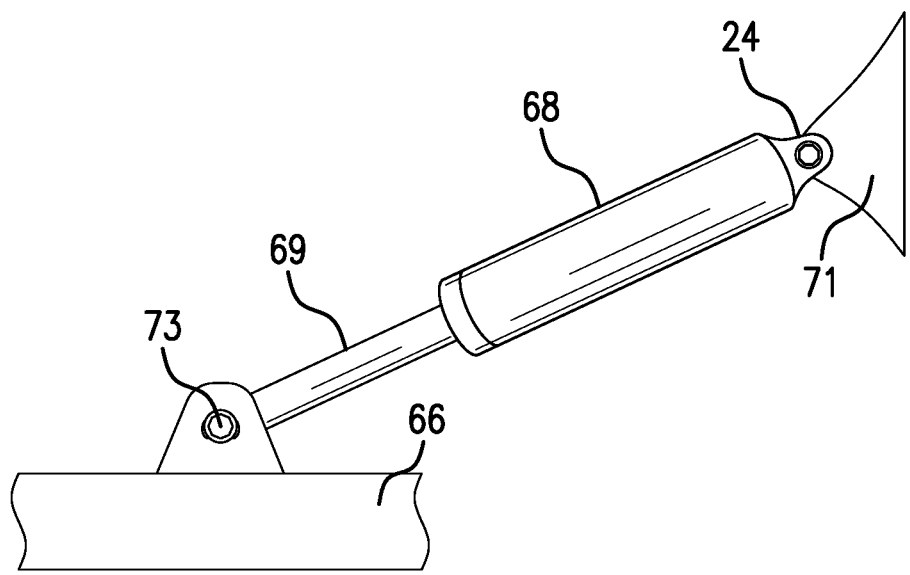

Heretofore, the lift actuators for tillage equipment have used an interconnection shown in FIG. 6. An actuator 90 has a pivotal connection 94 with a frame at its head end to permit only pivotal relative movement. However the actuator rod 92 connects with a sub-frame component 96 through a pin 100 received in an elongated slot 98. This permits the sub-frame 96 to float in the field position. With the interconnection shown in FIG. 5, sub-frames 66A, 66B, 66C, 66D, 66E, and 66F and auxiliary implements 78A, 78B, 78C, 78D, 78E, and 78F would be maintained in a position on the ground set by the various gauge wheels by the weight of the auxiliary implements and the sub-frames with associated components. Under certain operating conditions experienced in the field, the reliance on gravity to hold the ground engaging implements in place may be impaired.

Figure 2:
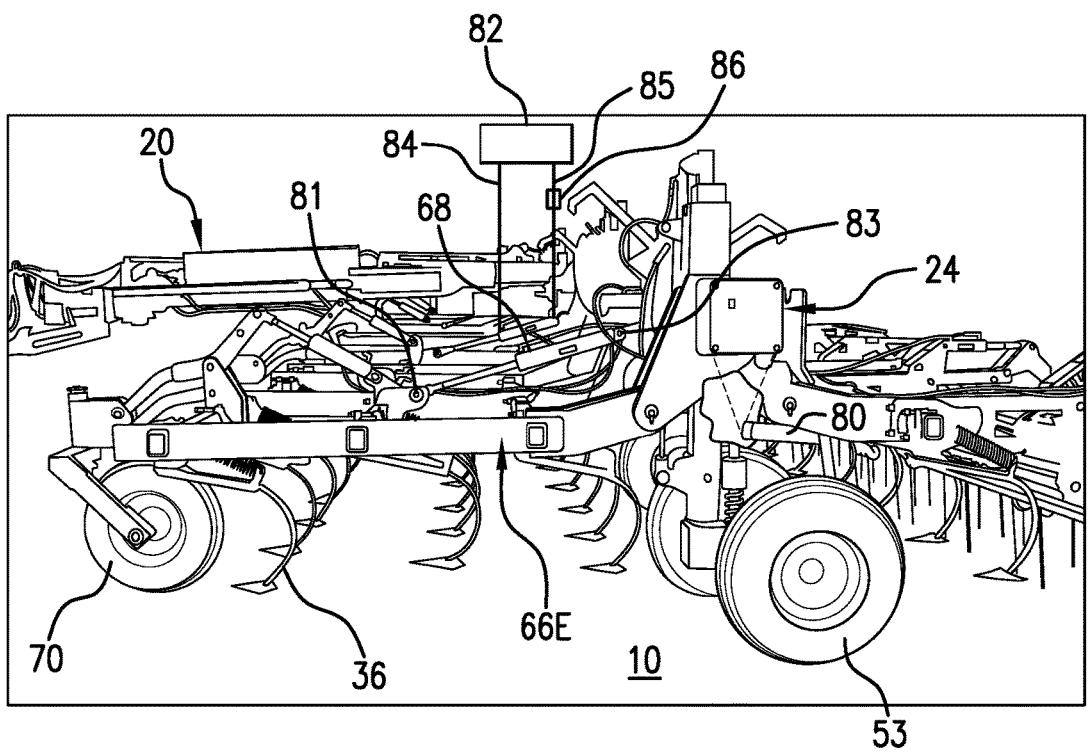
FIG. 2 is a side view of the tillage implement shown in FIG. 1, showing a forward section.
Figure 3:
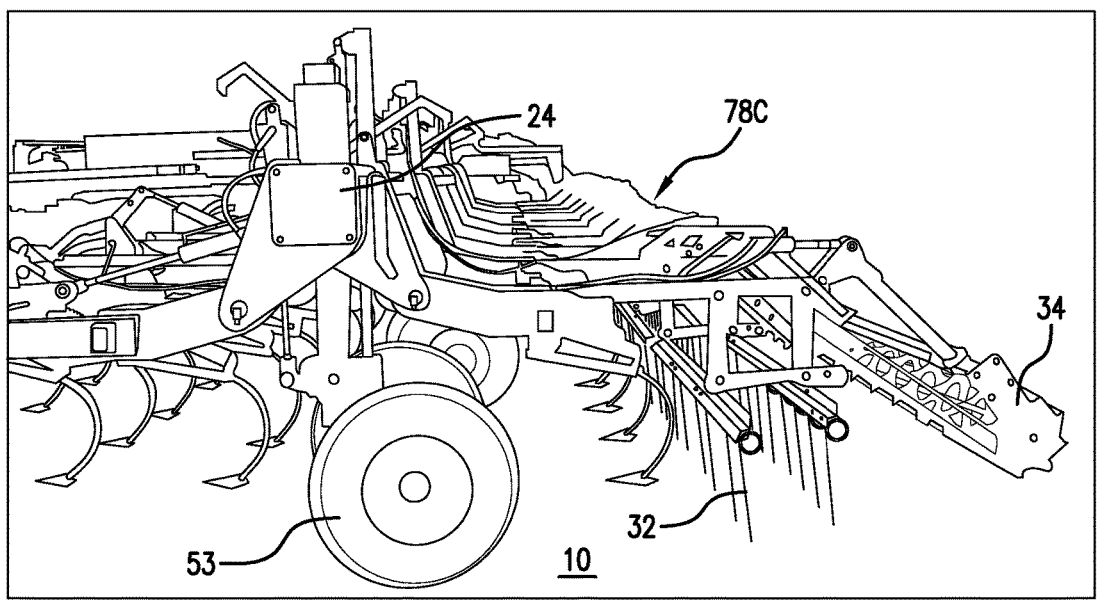
FIG. 3 is a side view of the tillage implement shown in FIG. 1, showing a rearward section.

In accordance with the present embodiment, the control systems described hereafter maintain the ground engaging implements positively in place with a predetermined force. Referring first to FIG. 2, the sub-frame assemblies, specifically 66E are shown extending forward of the tool bar segments and are set at a position established by gauge wheels 70 to provide the appropriate ground penetration of cultivator shanks 36. Actuators 68 are pivotally interconnected between the sub-frames 66 and the tool bar 24 at 81 and 83, respectively. A hydraulic controller 82, which may be configured as a universal control module, directs pressurized fluid through line 84 to the rod end and line 85 to the head end of actuator 68 to apply force to the sub-frames 66 to either position them in the illustrated operating position of FIG. 1 or an elevated transport position. The rod end 84 is energized to elevate the sub-frames and the head end through line 85 is energized and pressurized to lower it to the operating position. Controller 82 is configured to apply a predetermined hydraulic pressure to line 84 or 85. A pressure regular schematically shown at 86 may be provided in the line 85 for fluid connection between the controller 82 and the head end of the actuator 68 to apply a regulated predetermined down force on the sub-frames 66 when in the illustrated operating position. This adds the force of the implement to the weight of the sub-frame and associated components to affirmatively and positively urge the implement to maintain the level set by gauge wheels 70.

Figure 4:
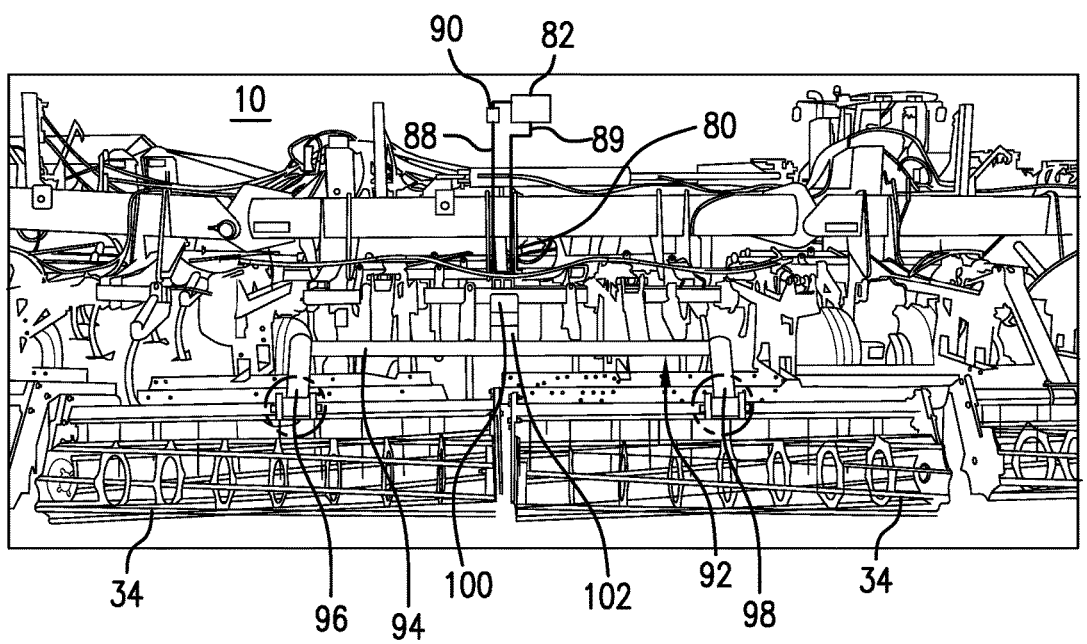
FIG. 4 is a rear view of the tillage implement shown in FIG. 3.

Likewise, in FIGS. 2 and 4 the lift actuator 80 for the auxiliary implements 78 may be supplied with pressurized fluid from the same controller 82 but through lines 88 and 89. As in the case of the actuator 68, a pressure regulator, schematically shown at 90, may be provided to apply regulated pressure to the head end of actuator 80 to apply a predetermined down force for the auxiliary implements 78. The controller 82 and actuators 68 and 80 may be configured so that they apply pressure independently of the other so as to fine tune the conditioning of the ground over which the implement travels.

In addition to the flexibility provided by independent application of force forward and rearward of tool bar 24, a support frame 92 is provided to flexibly apply downward force to the crumbler baskets 34. The flexible frame 92 is a form of walking beam having a transverse cross beam 94 extending between adjacent crumbler baskets 34 and pivotally connected thereto at frames 96 and 98. The pivotal connection between the frames 96 and 98 and cross beam 94 permits limited pivotal movement. The cross beam 94 is connected to a central frame 100 at a pivotal connection 102 intermediate the ends of the cross beam 94. So to does the pivotal connection 102 have a limited pivoting capability. Thus, when actuator 80 applies the predetermined down force, it is applied to adjacent crumbler baskets but permits an ability for the crumbler baskets to alter to local undulations in the ground to provide a more precise and controlled finishing of the soil.

The interconnection between the actuators 68, 80 and their associated components is illustrated in FIG. 6, showing actuator 68, with the interconnection for actuator 80 being similar. Actuator 68 is connected to tool bar 24 at a pivotal connection 71 permitting only relative pivotal movement. A rod 69 for actuator 68 is connected to sub-frame 66 at a pivotal connection 73 that permits only relative pivotal movement without substantial play. This enables the actuators 68 and 80 to apply a controlled down force on the sub-frames.

In operation, the implement 10 initially is in a transport position in which the various sub-frames 66 and auxiliary implements 78, as well as the central frame implements, are in the transport position. The actuators are then operated to lower the implements to the operating condition illustrated in FIG. 1. In this position, the actuators 68 and 80 are energized to apply a predetermined downward force on the sub-frame 66 and auxiliary implements 78. This downward force may be independently adjusted front to rear to provide a superior finishing of the soil. Although not specifically described to simplify the understanding of the present invention, the center sub-frames and auxiliary implements may be provided with a similar control to the respective actuators to independently control the pressure with which they are urged towards the ground.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tillage implement comprising:
    a main frame section having a tool bar and including a pull hitch extending in a travel direction, said tool bar extending laterally relative to said pull hitch;
    at least one wing section having a tool bar extending laterally relative to said pull hitch and pivotally coupled with said main frame section about at least one axis to pivot outward to a laterally extending operating position;
    at least one forward sub-frame pivotally connected to said at least one wing section about a generally horizontal axis forward of said tool bar and at least one rearward sub-frame pivotally connected to said at least one wing section rearward of said tool bar;
    a gauge wheel assembly connected to said at least one forward sub-frame for establishing the elevation of said at least one forward sub-frame relative to the ground;
    actuators connected between said at least one wing section and said at least one forward and rearward sub-frames to pivot the said at least one forward and rearward sub-frames between an operating position where the gauge wheel contacts the ground and an elevated transport position;
    a controller formatted to and energizing said actuators to displace said at least one forward and rearward sub-frames between said operating and transport positions;
    said controller being configured to urge said actuators to pivot said at least one forward and rearward sub-frames towards the ground in said operating position with a predetermined force urging the said at least one forward and rearward sub-frames towards the ground independent of one another.

2. The tillage implement as claimed in claim 1, wherein said actuators are hydraulic actuators.

3. The tillage implement as claimed in claim 2, wherein said actuators operate on hydraulic pressure and said implement further comprises a pressure regulator regulating the pressure urging the said at least one sub-frame towards the ground in proportion to the pressure set by the regulator.

4. The tillage implement as claimed in claim 1, further comprising ground engaging components fixed to said at least one forward and rearward sub-frames.

5. The tillage implement as claimed in claim 1, wherein said at least one rearward sub-frame further comprises a rocker frame.

6. The tillage implement as claimed in claim 5, further comprising ground engaging components on said rocker frame with the said at least one rearward sub-frame being connected to said rocker frame in between adjacent said ground engaging components.

7. The tillage implement as claimed in claim 6, wherein said ground engaging components comprise at least one of a spring tooth drag, crumbler basket, spike tooth drag, and cultivator shank.

8. The tillage implement as claimed in claim 1, wherein the at least one wing section comprises right and left wing sections connected to said main frame section.

9. The tillage implement as claimed in claim 1, wherein said actuators are interconnected between said at least one wing section and said at least one forward and rearward sub-frames with connections permitting only pivotal relative movement.

10. A method of managing ground engaging loads on a tillage implement having a main frame and at least one wing section pivotally coupled to the main frame to pivot outward to a laterally extending operating position, including a laterally extending tool bar and at least one forward sub-frame pivotally connected to the at least one wing section forward of said tool bar and at least one rearward sub-frame pivotally connected to said at least one wing section rearward of said tool bar and actuators connected between said at least one wing section and the at least one forward and rearward sub-frames to pivot the at least one forward and rearward sub-frames between an operating position towards the ground and an elevated transport position, said method comprising the step of lowering said at least one forward and rearward sub-frames to their operating position; and applying a predetermined force on said at least one forward and rearward sub-frames towards the ground independent of one another.

\* \* \* \* \*